US009370137B2

(12) United States Patent
Hennes

(10) Patent No.: US 9,370,137 B2
(45) Date of Patent: Jun. 21, 2016

(54) AGRICULTURAL IMPLEMENT HAVING DIVERSE HITCH AND GANG OPERATION MODES

(71) Applicant: Mark Hennes, Beloit, KS (US)

(72) Inventor: Mark Hennes, Beloit, KS (US)

(*) Notice: Subject to any disclaimer, the term of this patent is extended or adjusted under 35 U.S.C. 154(b) by 24 days.

(21) Appl. No.: 14/349,647

(22) PCT Filed: Dec. 14, 2012

(86) PCT No.: PCT/US2012/069922
§ 371 (c)(1),
(2) Date: Apr. 3, 2014

(87) PCT Pub. No.: WO2013/090826
PCT Pub. Date: Jun. 20, 2013

(65) Prior Publication Data
US 2015/0021059 A1 Jan. 22, 2015

Related U.S. Application Data

(60) Provisional application No. 61/576,974, filed on Dec. 16, 2011.

(51) Int. Cl.
*A01B 61/02* (2006.01)
*A01B 21/08* (2006.01)
(Continued)

(52) U.S. Cl.
CPC ............... *A01B 61/02* (2013.01); *A01B 21/08* (2013.01); *A01B 21/083* (2013.01); *A01B 23/04* (2013.01); *A01B 23/046* (2013.01); *A01B 61/00* (2013.01); *A01B 63/24* (2013.01)

(58) Field of Classification Search
CPC .............................. A01B 21/08; A01B 23/046
USPC ................................................. 172/599, 600
See application file for complete search history.

(56) References Cited

U.S. PATENT DOCUMENTS 1,472,515 A 10/1923 Dickinson
1,611,358 A * 12/1926 Miller .................. A01B 23/046
172/177

(Continued)

FOREIGN PATENT DOCUMENTS

EP 0213579 A2 8/1986

OTHER PUBLICATIONS

Optimizing the performance of tractors in disc harrow systems, http://cigr.ageng2012.org/images/fotosg/tabla_137_C0099.pdf.
(Continued)

*Primary Examiner* — Gary Hartmann
(74) *Attorney, Agent, or Firm* — Jeffrey L. Thompson; Thompson & Thompson, P.A.

(57) ABSTRACT

An agricultural implement (10) has front and rear gangs (12, 13) of rotatable tillage tools arranged to follow each other along a line of travel. The front and rear gangs (12, 13) are mounted to a main frame (21F), which is mechanically linked to a hitch frame (22) by a self-leveling linkage system (32, 33). The linkage system (32, 33) includes a spring assembly (48) arranged to allow relative movement between the hitch frame (22) and the main frame (21F) when the implement (10) is in a lowered field working position. The linkage system (32, 33) has a pivoting cam (41) for changing the field working preload of the spring assembly (48) to provide multiple hitch operation modes. The linkage system (32, 33) is arranged to make the main frame (21F) level and the hitch frame (22) rigid relative to the main frame (21F) when the implement (10) is in a raised position. The linkage system (32, 33) also includes an adjustable stop device (43) that limits upward hitch movement to provide multiple rear gang hitch operation modes.

12 Claims, 13 Drawing Sheets

(51) Int. Cl.
*A01B 23/04* (2006.01)
*A01B 61/00* (2006.01)
*A01B 63/24* (2006.01)

(56) References Cited

U.S. PATENT DOCUMENTS

| | | | |
|---|---|---|---|
| 2,046,851 A | 7/1936 | Rutter | |
| 2,938,588 A * | 5/1960 | Stein | A01B 23/046 172/240 |
| 2,952,325 A | 9/1960 | Toland | |
| 3,080,933 A | 3/1963 | Kramer et al. | |
| 3,191,691 A | 6/1965 | Newkirk | |
| 3,223,178 A | 12/1965 | Clifford et al. | |
| 3,912,017 A | 10/1975 | Rehn | |
| 3,912,018 A | 10/1975 | Brundage et al. | |
| 4,180,135 A | 12/1979 | Birkenbach et al. | |
| 4,373,591 A | 2/1983 | Schaaf et al. | |
| 4,428,435 A | 1/1984 | Hubbard et al. | |
| 4,785,891 A * | 11/1988 | Noland | A01B 39/14 172/185 |
| 5,042,590 A * | 8/1991 | Bierl | A01B 21/08 172/572 |
| 5,207,279 A * | 5/1993 | Nelson | A01B 23/046 172/140 |
| 5,462,123 A | 10/1995 | Harlan et al. | |
| 5,628,373 A | 5/1997 | Domries | |
| 5,915,481 A | 6/1999 | Flenker et al. | |
| 5,992,535 A | 11/1999 | Bierl et al. | |
| 6,035,943 A | 3/2000 | Gerein et al. | |
| 6,397,953 B1 | 6/2002 | Ankenman | |
| 6,612,381 B2 | 9/2003 | Powell et al. | |
| 7,000,708 B2 | 2/2006 | Powell et al. | |
| 7,108,075 B2 | 9/2006 | Powell et al. | |
| 7,131,501 B1 * | 11/2006 | Svendsen | A01B 23/046 172/601 |
| 8,074,728 B2 | 12/2011 | Kovach et al. | |
| 8,074,730 B2 | 12/2011 | Kovach et al. | |
| 8,302,700 B2 | 11/2012 | Kovach et al. | |
| 8,336,639 B2 | 12/2012 | Palen | |
| 8,534,374 B2 | 9/2013 | Hake et al. | |
| 2006/0124327 A1 * | 6/2006 | Powell | A01B 23/046 172/600 |
| 2009/0133888 A1 | 5/2009 | Kovach et al. | |
| 2010/0314144 A1 | 12/2010 | Hennes | |

OTHER PUBLICATIONS

Summers 2510 DT, Summers Manufacturing, Inc., Dated 2012, http://www.summersmfg.com/literature/2510%20DT_0912.pdf.
Summers Diamond Disk Pre-2011, Literature Date 2012, http://www.summersmfg.com/literature/DiamondDisk_0912.pdf.
Summers 2009 Parts Manual, Multiple products compilation: See Section 5, Diamond Disk, http://www.summersmfg.com/OMs/2009%20Parts%20Manual%20(8Z1130).pdf.
Summers DT9530: New 2013, http://www.summersmfg.com/literature/DT9530.pdf.
PCT International Search Report, International Application No. PCT/US2012/069922, Mar. 7, 2013.

* cited by examiner

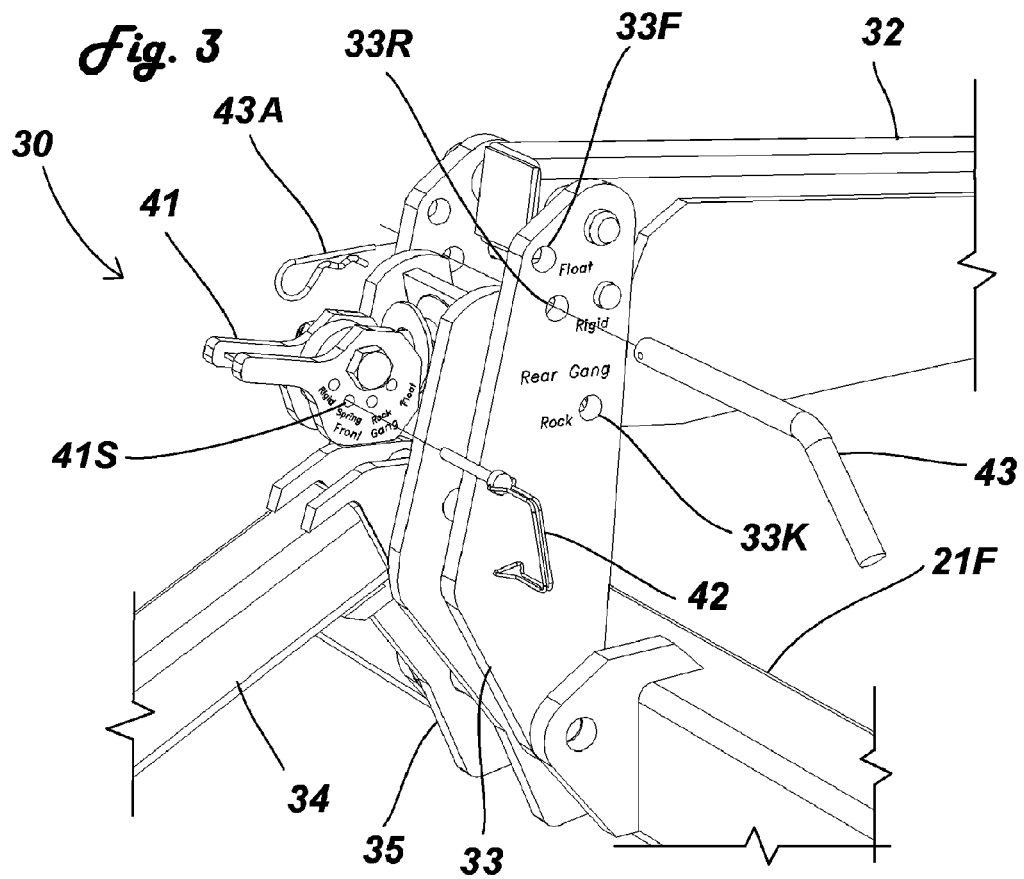
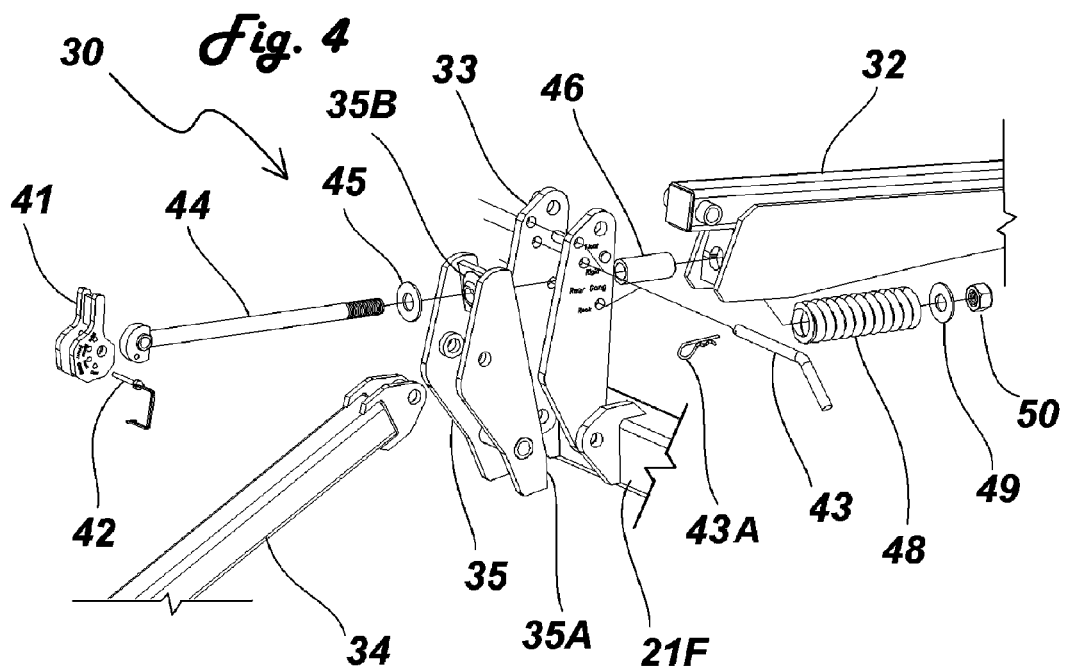

AGRICULTURAL IMPLEMENT HAVING DIVERSE HITCH AND GANG OPERATION MODES

RELATED APPLICATIONS

This application claims priority of U.S. Provisional Application No. 61/576,974 filed on Dec. 16, 2011. The content of this prior application is incorporated herein by reference.

BACKGROUND OF THE INVENTION

1. Field of the Invention

The present invention relates generally to tillage equipment, and in particular, to agricultural implements having first and second gangs of rotatable tillage tools arranged to follow each other along a line of travel.

2. Description of the Related Art

Conventional tandem X-shaped disk harrows use a forward swept front gang configuration where the front disk blades throw the soil outward from the center, resulting in a downward and inward set of blade reaction forces to acquire higher soil penetration loads than the machine could generate by its own weight. This system worked well for early general purpose disk harrows where the common disk blade diameter was 18" to 22" and machine frames generating less than 150 pounds per blade.

With the increase in crop residue and the need for greater soil penetration over the years, today's general purpose disk harrows now use 24" diameter blades with machine frames generating 200 plus pounds per blade. Consequently, with the added machine weight and increased horsepower of today's tractors, the forward swept gang configuration can generate unstable reaction forces at the wing hinge points that may result in frame buckling, outer end soil ridging, unlevel field performance and high speed frame bounce. To help stabilize the front wing gangs, wing gauge wheel assemblies have been added by manufactures to dampen and prevent excessive unstable blade reaction forces. For proper machine operation, the gauge wheel assemblies require constant adjustments for different soil conditions and different machine operating depths. High speed frame bounce is usually caused by the harmonic action between the front gang's C-shank spring hangers and a very firm soil profile at speeds above 7 mph. The forward swept wing gangs bite into the firm soil compressing the spring hangers which then recoil upward to allow the gangs to raise up slightly. The gangs bite in again and recoil a little higher, over and over until the frame takes on a noticeable bounce as it traverses the field.

There is a need for a better gang configuration that provides stable reaction forces to prevent wing buckling and high speed frame bounce while eliminating the need for front wing gauge wheels. An inverted front V-shaped gang with its apex pointed in the direction of travel has been used successfully on a disk harrow frame for many years. Sometimes referred to as a "diamond disk," they have some advantages and disadvantages over the conventional X-shaped disk harrows. One advantage is the ability to operate in floating hitch mode due to the stable, self-gauging nature of the front gangs. The blade reaction forces on an inverted front gang are outward instead of inward, providing stable tension across the front hinge line. Floating hitch operation mode provides better disk harrow performance on fields with widely varying terrain changes or rocky fields that need gang protection. Under different field conditions, such as shallow seedbed preparation on low sloped fields, the same tillage tool may work better in a more traditional spring-biased hitch operation mode.

Another advantage of an inverted front gang arrangement is the ability to maintain level field performance over a wide variety of operating depths, operating speeds and gang angle changes. The level performance of an X-shaped disk harrow is very sensitive to any type of dynamic gang force changes, resulting in the need to continually re-adjust the front-to-rear level settings and/or front wing gauge wheel position. An inverted front gang arrangement with stable blade reactions, can handle wide variations in dynamic gang force changes without the need for continuous level adjustments.

There are two main disadvantages of an inverted front gang arrangement over conventional X-shaped disk harrows. The weight distribution between the center frame and the wing frames are polar opposites between the two different gang arrangements. The X-shaped disk harrow has a short front-to-rear dimension for its center frame, and wing frames that are generally longer than the center frame. The longer wing frames help distribute the needed weight to the wings to balance out the average weight per blade.

In contrast, the diamond-shaped disk harrow has a long front-to-rear center frame dimension, and wing frames that are generally shorter than the center frame. The center frame weight per blade will likely be much higher than the weight per blade of the wings causing the wings to not penetrate as well as the center frame. Ideally, in order to balance the weight per blade by physical weight alone, weight would need to be added to the wing sections along with some reduction in weight from the center frame. By adding physical weight to the wings, the folded transport center of gravity will rise causing possible unsafe conditions on roadside inclines.

Another disadvantage of a symmetrical diamond-shaped gang arrangement is the front center soil movement being thrown into each other causing plugging and/or not tilling the center line area. If the spacing between the front left and right gangs is widened to prevent plugging, larger weeds at the center line will not be removed.

There is a need for an improved frame and gang arrangement that eliminates these disadvantages while adding diverse gang angle and hitch operation modes, in an efficient compact economical design.

SUMMARY OF THE INVENTION

An object of the present invention is to provide an agricultural tillage implement with a versatile self-leveling spring-biased hitch mechanism that offers multiple and diverse hitch operation modes to match the field conditions at hand by changing simple and intuitive hand-operated controls located at the front of the machine.

The primary purpose of the spring, or other elastic member, in a spring-biased hitch is to allow the hitch to deflect downward as needed when working over a mounded soil structure, such as a field terrace, or to allow the front of the machine to raise upward as needed during an encounter with an immovable field obstruction. On most X-shaped disk harrows, the hitch spring pressure is preset to a substantial working force and is not usually adjustable. On X-shaped disk harrows, the spring pressure is also used to help control the depth of the front gangs in soft field conditions. On a straight gang machine or a diamond-shaped gang machine, the front gangs are not so dependent on a preset spring pressure, thus the spring pressure can be increased, decreased or reduced completely, under certain conditions, to provide rigid hitch, rock protection or front gang floating hitch operation modes, respectively.

A feature of the present invention is a spring-biased self-leveling mechanism that provides multiple hitch operation modes by changing quick and easy controls near the front of the machine.

One object of the present invention is to provide a self-leveling spring-biased hitch system with a quick and easy means to control or deactivate the spring pressure setting affecting the front gang's operation. This is done by varying the activation distance along the spring rod that engages the hitch bias spring. In other words, this setting varies the amount of working spring pressure that can be applied to the hitch. This feature provides a spring-biased self-leveling mechanism with multiple hitch operation modes that can be changed using quick and easy controls near the front of the machine. The mode changes may involve incremental settings or a continuous movement through a range of mode settings.

A pivoting cam mechanism is attached to the front of the spring rod to change the activation distance which engages the spring as the machine lowers into field position. The cam provides four different incremental hitch mode settings listed from the most spring pressure to the least, namely; Rigid, Spring, Rock and Float.

In Rigid mode, the cam or other varying device causes the spring to be compressed significantly as the machine lowers into field position while still providing enough spring travel left to prevent high hitch stresses. This spring pressure would be similar to that of an X-shaped disk harrow. Field conditions for use in Rigid mode would include: Stone free semi-level fields, with compaction zones that need to be cut through completely.

In Spring mode, the cam or other varying device causes the spring to be compressed normally as the machine lowers into field position. This mode would allow good all purpose hitch flexing while still having enough spring pressure to hold the front gangs down while cutting through compacted zones. Field conditions for use in Spring mode would include: General all-purpose field conditions without large field obstructions.

In Rock mode, the cam or other varying device causes the spring to be compressed slightly as the machine lowers into field position. This mode is used for fields where rock protection is needed to protect the front gangs from damage. Field conditions for use in Rock mode would include: Fields with many immovable rock or stump obstructions or fields with semi-sharp terrain changes.

In Float mode, the cam or other varying device causes the spring to be substantially loose as the machine lowers into field position. This mode is use for fields with sharp terrain changes and can be used to provide a higher degree of rock protection. Field conditions for use in Float mode would include: Any field where the front gangs self-gauging working depth is adequate and it is desirable for the machine to follow the terrain's elevation contour precisely, while minimizing gang damage from frequent field obstructions.

Another feature of the present invention is the ability to control the rear gangs rigid and float operation modes independent of the front gangs rigid and float modes. In rear gang rigid mode, the hitch is not allowed to flex upward very much as the machine traverses sharp terrain changes. This is a common situation seen on X-shaped disk harrows. As the front of the disk harrow enters a very low depression such as a terrace channel, the front gangs will come out of the ground when the upward hitch flex is used up. On the present invention, the rear gang mode is changed from rigid to float or rock mode by moving a pin that normally limits the upward hitch movement. This allows the hitch to flex upward farther than in rigid mode. In rear gang float mode, the front gangs can easily follow the deep contour changes as the machine traverses uneven terrain. Rear gang rock mode is an intermediate setting between rigid and float modes that provides more upward hitch flex than rigid mode, but less than float mode for use in rocky conditions.

Another feature of the present invention is the rotational engagement of the horizontal level bar and the hitch control linkage during the lift process, which returns the machine to the same level state regardless of the rear gang operation mode. The hitch control linkage is defined as the combination of the vertical control link 35 and the hitch bar 34. This feature guarantees the proper machine level during transport and field end row turning while also freeing up the mode operation pins and controls to allow quick and easy hitch operation mode changes. When the rear gang setting is in rigid mode, the rear gang adjustment pin 43 pushes the rocker control link 35 forward at a rate to make the machine come up level. When the rear gang setting is not in rigid mode, the machine's front gang lift rate will be slower than the rear gang's lift rate until the level spacer tube 46 contacts the control link 35. As the machine is raised, the level spacer tube 46 pushes the rocker control link 35 forward to accelerate the front gangs upward motion until the machine is level at the raised lift position. At the top of the lift stroke, the level spacer tube pushes the rocker control link beyond the rigid pin position hole to allow pin position changes. An alternate self-level system is shown in FIG. 20 where the level bar 32 contacts the rocker control link 35 at the top of the raised position to release the load on the rigid pin position as above. The raised load path 30L is then transferred through point 30P by the rotational convergence of the level bar 32 and the vertical rocker control link 35.

Another feature of the present invention is the position and movement of the center ground transport wheels in relation to the hitch operation modes. While in floating hitch operation mode, the towing vehicle will not provide any depth control for the front gang. Therefore, the machine's depth gauging wheels must be positioned close to the center of gravity of the machine to provide depth support to both the front and rear gangs. When the machine is raised for transport, the center wheels need to rotate rearward to generate safe positive tongue weight while balancing the weight of any rear attachments.

Another feature of the present invention is having the wing lift and wheel assemblies move in opposite directions relative to the center wheel assemblies. The wing wheel assemblies are arranged to move the wing wheels rearward away from soil flow when the implement is lowered to its field working position, and to move the wing wheels forward to support both gangs when the implement is raised to its transport position.

Another feature of the present invention is an agricultural implement with angle adjustable gang assemblies for variable soil and residue disturbance needs and versatile wing fold members that attach the wings to the center frame. The wing hinge point needs to be as low as possible to minimize the folded transport height and limit gang interference during downward wing flex. It is also desirable to have the pivot points for the ground support wheels in a low position below the frames to generate more vertical wheel travel during lift axle rotation. The low pivot generates an arc path that minimizes wheel interferences and allows the frames to be constructed shorter front to back. This also allows the hydraulic lift actuators to be nested inside the frame structure for a clean above frame appearance.

Another feature of the present invention is an efficient method to widen the center ground transport wheel base to a width that will offset the higher transport center of gravity without widening the center frame, while reducing center frame fold and transport stresses, allowing the center frame to be constructed lighter. For road transport safety considerations it is desirable to have the center ground transport wheels as wide as possible to prevent steep roadside incline mishaps. The center rear fold member is affixed to the underside of the center frame and contains the pivot point connections for the center ground transport axle in a low position as mentioned above. The outermost lift axle pivot points are located outside the main frame dimensions and close to the wing fold hinges. This location provides a more efficient transfer of wing weight to the center transport wheels during the folding sequence and road transport. Bending stresses on the center fold member are reduced due to the close proximity of the hinge while center frame stresses are almost completely eliminated. The center ground transport wheel base is widened, for safety considerations, without widening the center frame or incurring high bending stresses on the lift axle tube. The wing's fold members are also affixed to the underside of the wing frames in a like manner and contain low pivot point connections for the wing lift axles.

The front center wing fold members are affixed to the underside of the center frame in a like manner and are arranged in a V-shaped configuration with an apex of the V-shape pointing in the direction of travel to more efficiently carry the rearward and outward draft loads while providing convenient anchor attachment points for the front center gang angle adjustment system. This arrangement further reduces bending stresses on the center fold members so they can be constructed lighter to help reduce the overall weight of the center section as needed to help equalize the weight per blade between frame sections as mentioned above.

Variable gang angle settings for disk harrows are common in the prior art. More commonly found on offset disk harrows, gang angle changes allow the operator to vary the amount of soil and residue disturbance. Unfortunately, changing the gang angles on an X-shaped tandem disk harrow can upset the level performance of the machine. Any gang angle differences from side to side or front to back may cause uneven pulling, outside ridging or center ridges and furrows. The sensitive nature of the forward swept gang arrangement with its unstable reaction forces only compounds the level performance issues associated with gang angle changes. Most manufactures have eliminated any gang angle features on tandem disk harrows in favor of fixed gang angles that prevent most of the level performance problems. Some X-shaped vertical tillage tools have been introduced that provide different gang angle settings to meet the growing need for residue management tillage. The maximum angle of most of these machines have been limited to angles below 10 degrees due to the unfavorable dynamic forces encountered with forward swept gangs including high speed frame bounce. There is a need and a desire for a tool that can provide a wider range of changeable gang angle settings for different soil and residue disturbance needs that doesn't upset the level performance of the machine or create hard to control dynamic gang reactions.

Another feature of the present invention is a gang angling system that provides gang angle changes on the order of 18 to 20 degrees movement with respect to the frames to better fulfill the needs of today's progressive farmer. Gang angles of 0 to 5 degrees provide a high speed, shallow working "true vertical" tillage action, while gang angles of approximately 5 to 18 degrees provide a high disturbance vertical tillage action, while gang angles of 16 to 20 degrees cause the tillage tool to have a medium to slow speed, deeper working disk harrow type action. The invention uses an improved gang bar design in which a hooped component is affixed to the top of the gang bar that slides along a rigid bar attached to the frames during angle adjustments. This slide arrangement provides greater angle movement in a compact space and is located above the gang bar to prevent any interferences between the slide bar and normal gang components such as scraper assemblies. The slide arrangement shown includes a series of holes in the slide plate which can be used to secure the gang bar with pins or bolts as a simpler, more course set of adjustments or be used as a backup in case of an actuator failure. The holes shown are spaced for 5 degree angle adjustments and can also be used as a visual reference to the current angle when setting the gangs with the manual screw actuator. The hole pattern also includes a means to fix the gang bars at a zero degree angle (i.e., straight) for machine configurations involving straight running rotating tillage tools, such as chopper gangs, aeration spike tools, or non-concave plain or wavy coulters.

Another feature of the present invention is a gang angling actuator system that provides either individual manual screw gang adjustments or remotely operated hydraulic rephasing actuator adjustments. The two gangs on the front center frame can be linked together by a mechanical link to move in unison with each other to allow adjustment by a single manual actuator or by a dual master-slave rephasing hydraulic system. The two gangs on the rear center frame can also be linked together by a mechanical link to move in unison with each other to allow adjustment by a single manual actuator or by a hydraulic rephasing slave cylinder.

Another feature of the present invention is a front blade arrangement that has an offset apex from the center line of the machine and a fore-aft offset gang arrangement that allows a plug free overlapping arrangement.

Numerous other objects of the present invention will be apparent to those skilled in this art from the following description wherein there is shown and described exemplary embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF DRAWINGS

FIG. 3 is a perspective view of the self-leveling assembly mechanism showing the hitch mode pin placements for the front and rear gang settings.

FIG. 4 is an exploded view of the self-leveling, spring-biased hitch mechanism according to the present invention.

DETAILED DESCRIPTION OF THE INVENTION

An agricultural implement according to the present invention will now be described in detail with reference to FIGS. 1 to 21 of the accompanying drawings.

Figure 1:
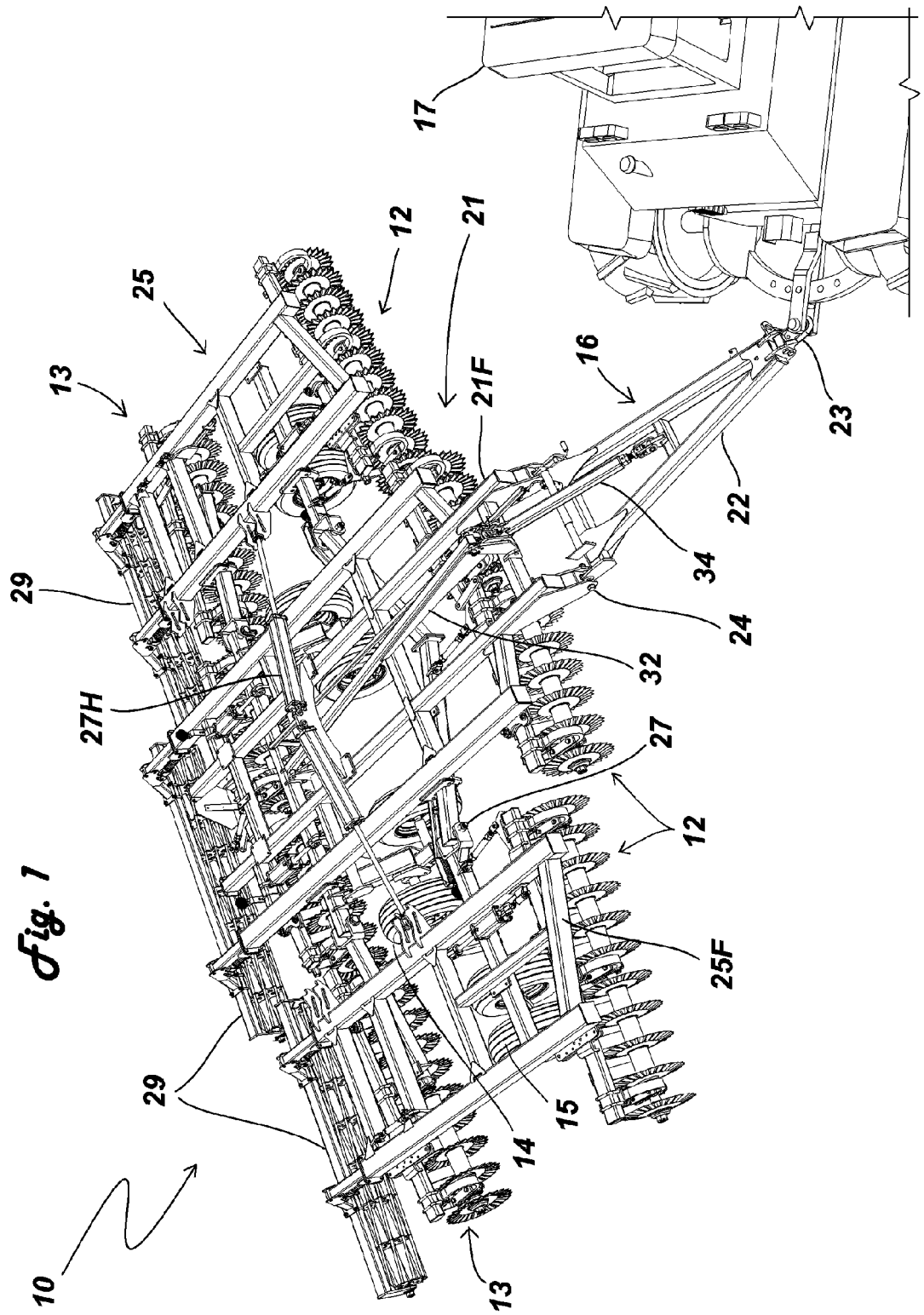
FIG. 1 is a perspective front view of a three-section shallow working tillage tool with gangs set at a 5 degree angle fitted with a soil conditioning attachment.

A tillage implement 10 according to the present invention is shown in FIG. 1. The implement 10 has three sections, including a center section 21 and first and second wing sections 25 connected to the center section 21. Each of the sections 21, 25 has a main frame 21F, 25F, a front gang 12 of rotatable tillage tools, and a rear gang 13 of rotatable tillage tools. The front and rear gangs 12, 13 are arranged in a substantially tandem formation with the rear gang 13 following the front gang 12 along a line of travel. The tillage tools on the rear gang 13 are arranged to laterally return soil displaced by the tillage tools on the front gang 12.

The front gang 12 on the center section 21 has a V-shaped configuration with its apex A pointing in the direction of travel. The front gang 12 on the wing sections is arranged generally as a continuation of the outer trailing ends of the V-shape of the front gang 12 on the center section 21. The V-shaped configuration provides a clean cut and ridge free outer end performance of the front gang 12 while preventing or minimizing high speed bounce.

Figure 10:
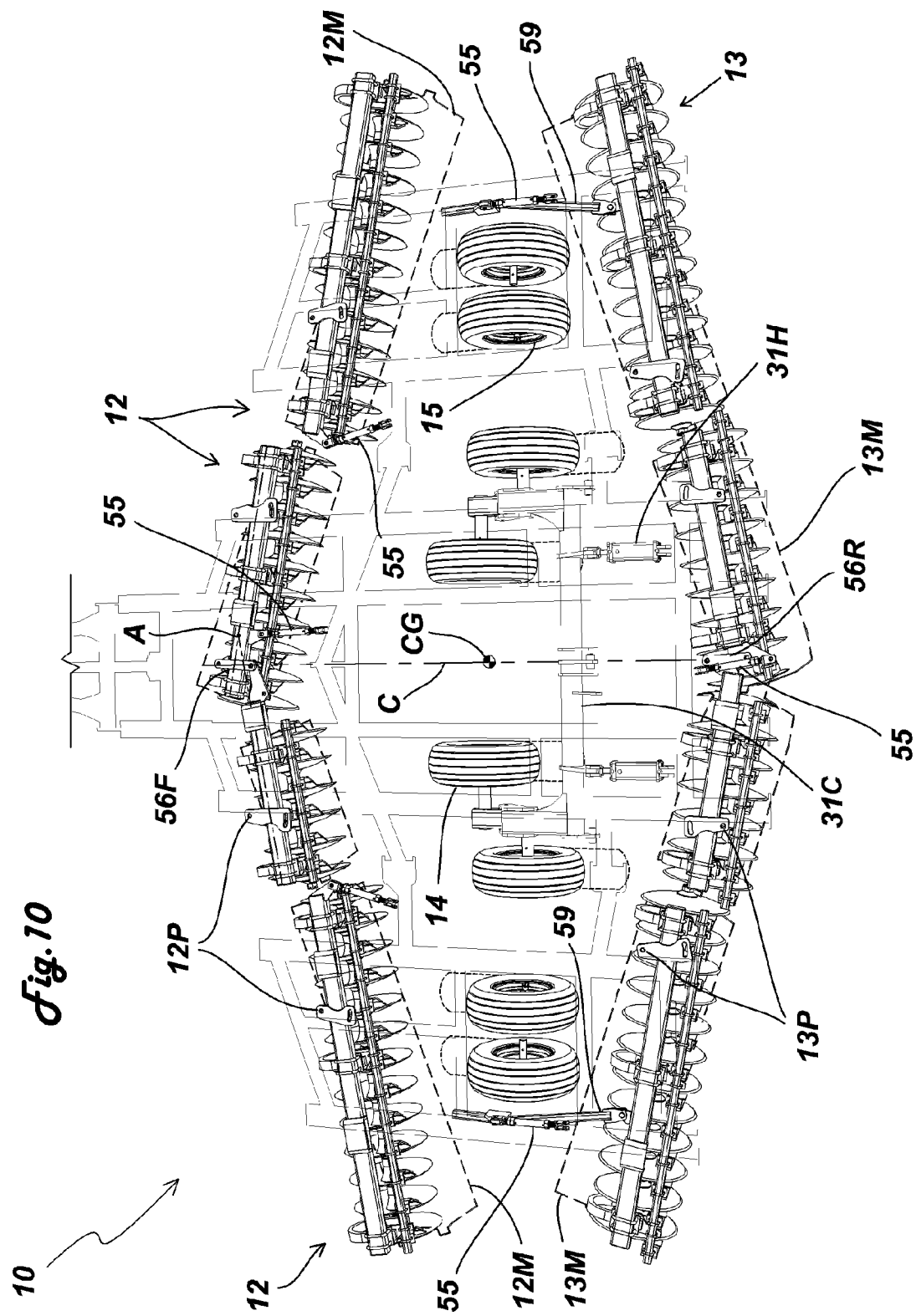
FIG. 10 is a plan view illustrating a blade and tire arrangement of a diamond-shaped disk harrow tillage tool with the gangs set at their lowest angle for vertical tillage and dashed lines for maximum gang angles fitted with manual turnbuckle actuators.
Figure 11:
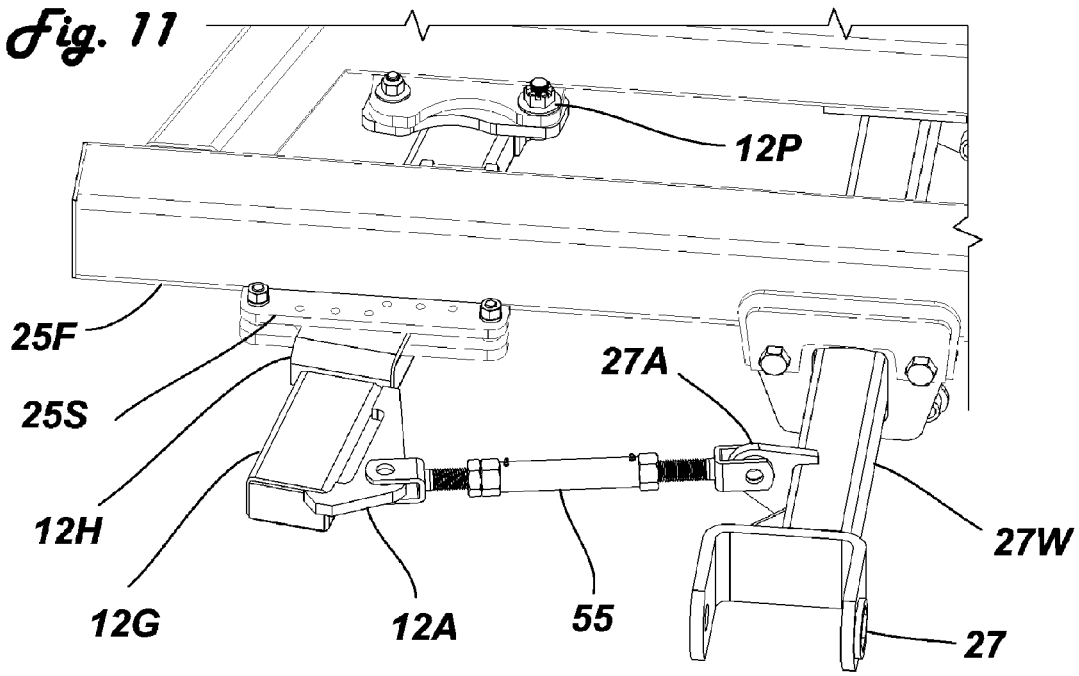
FIG. 11 is a partial front wing perspective view of the gang bar angle adjustment actuator, gang pivot point and hooped component inside the slide plate assembly.
Figure 12:
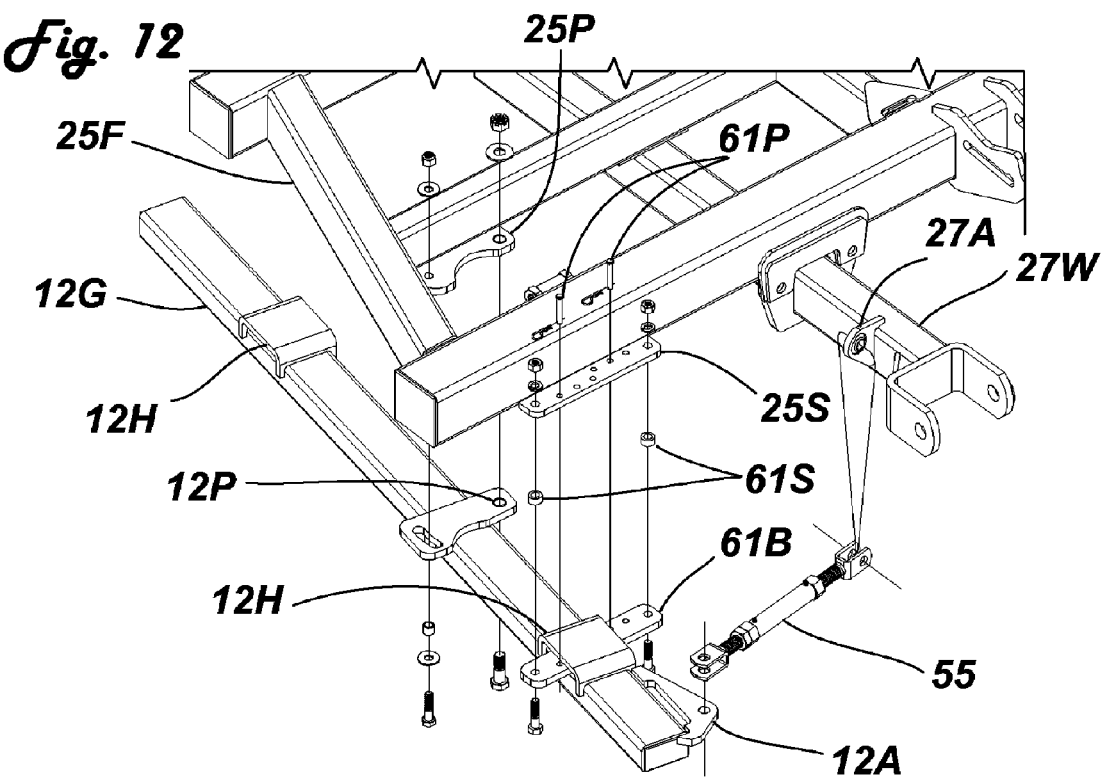
FIG. 12 is a partial front wing exploded view of the gang bar angle adjustment parts according to the present invention.
Figure 13:
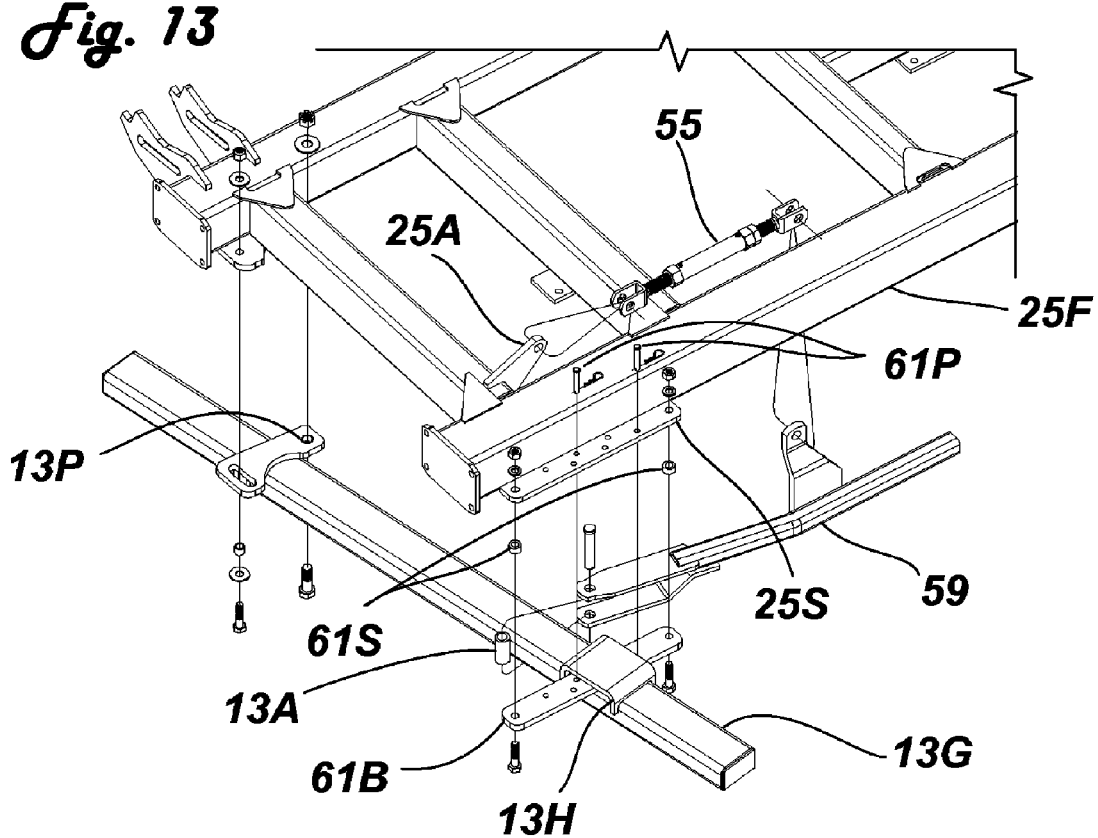
FIG. 13 is a partial rear wing exploded view of the gang bar angle adjustment parts according to the present invention.
Figure 14:
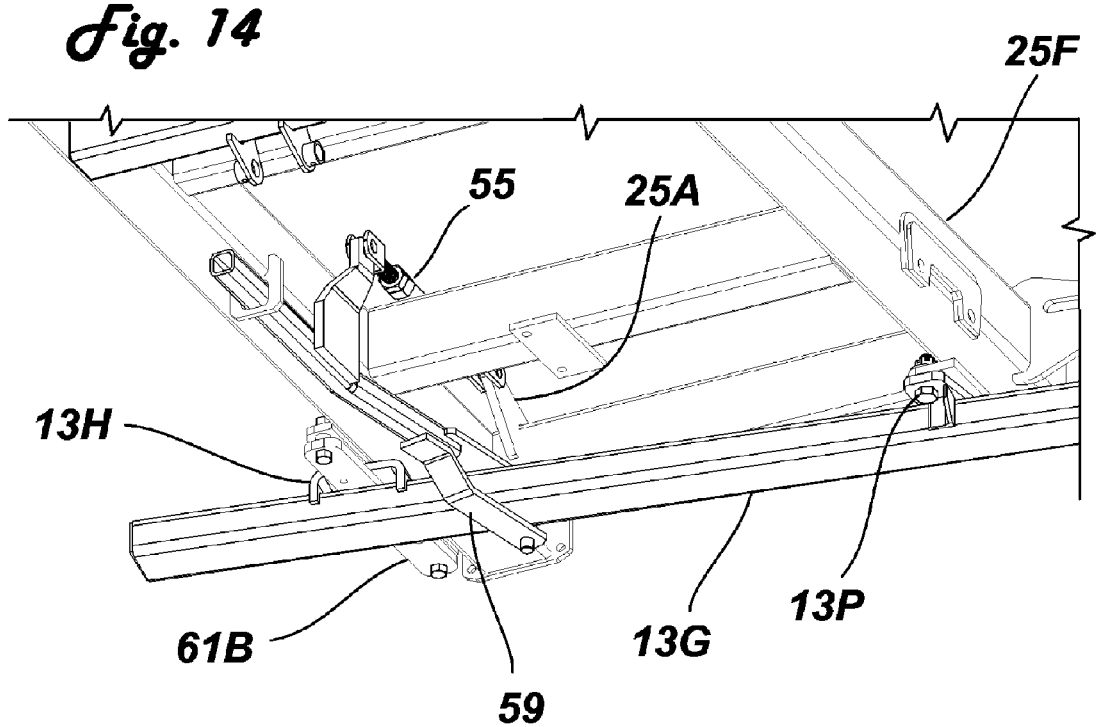
FIG. 14 is a partial rear wing perspective underside view of the gang bar angle adjustment turnbuckle, gang pivot point and wing gang adjustment bar.

In the embodiment illustrated in FIG. 10, the apex A of the front gang 12 is offset slightly from the centerline C of the implement. In this embodiment, the number of left and right front gang blades are unequal on each side of the implement 10. The long center gang is positioned farther forward than the shorter gang to provide an overlapping blade arrangement with full soil cutout and plug free operation.

Figure 2:
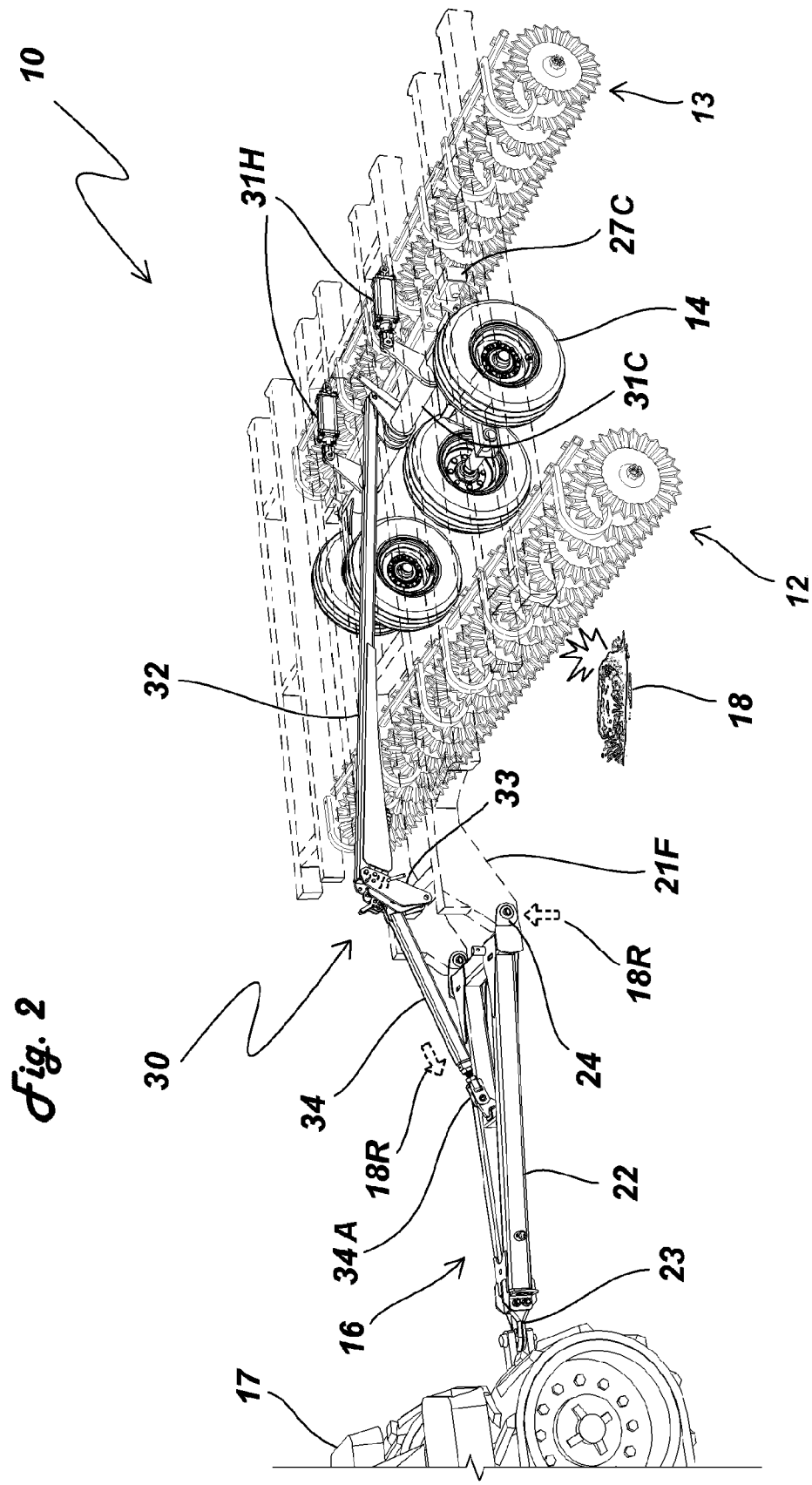
FIG. 2 is a partial perspective side view of a generic straight gang shallow working tillage tool encountering a field obstruction and showing the resulting hitch reactions.
Figure 5:
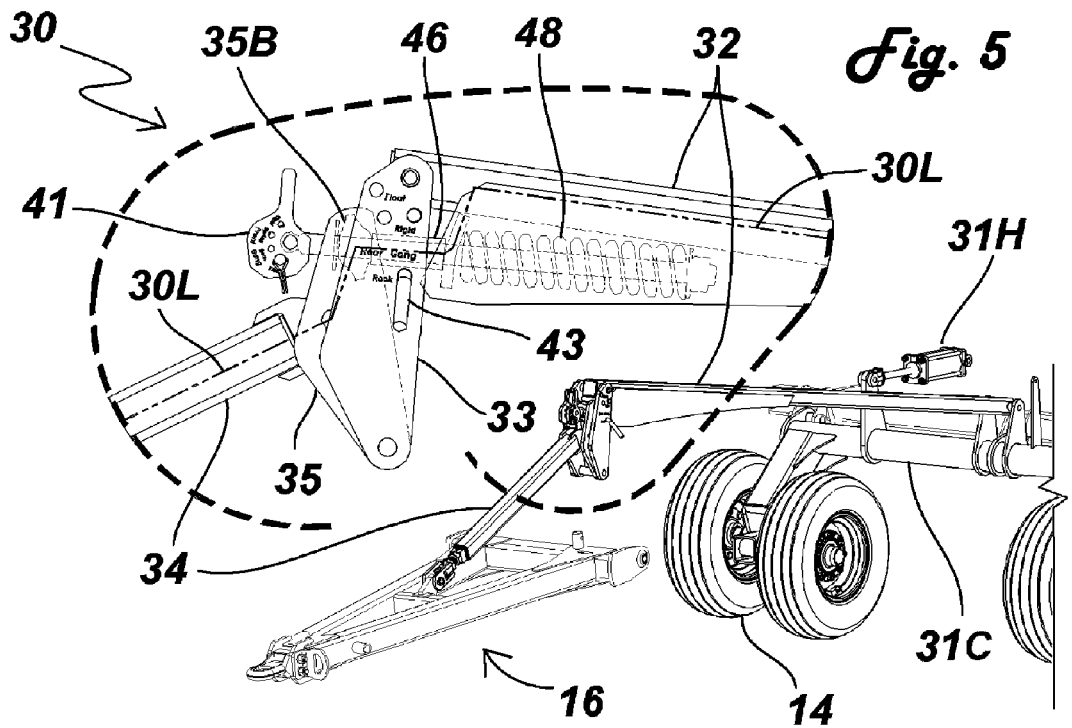
FIG. 5 is a cut away view of the self-leveling, spring-biased hitch mechanism in the raised lift position showing the rotational convergence and load transfer between level bar 32 and rocker control link 35, being transferred through level spacer 46 and the resulting load path 30L.
Figure 9:
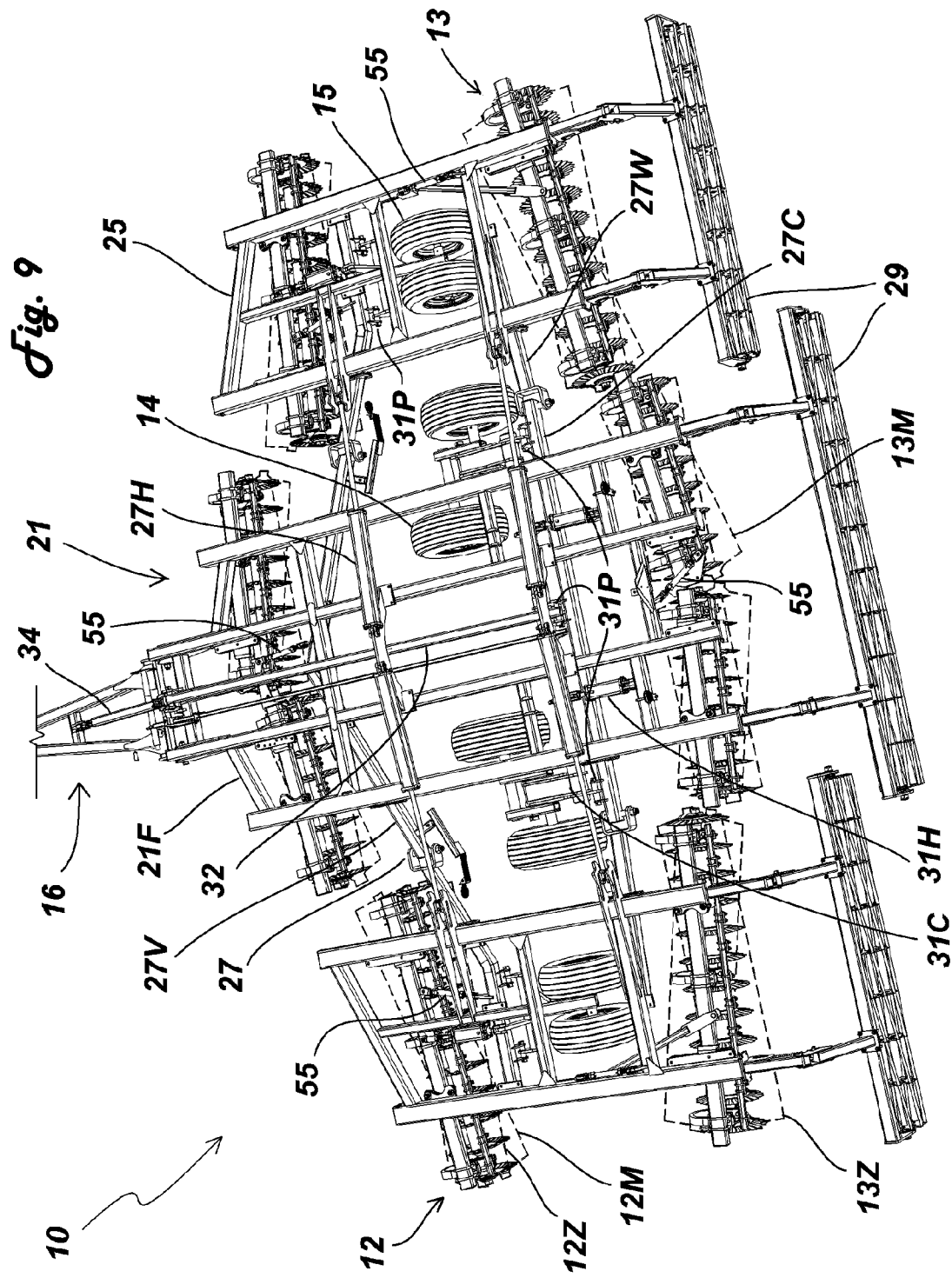
FIG. 9 is a perspective rear view of a wide center three-section shallow working tillage tool with gangs set at a 5 degree angle for low soil disturbance with dashed lines showing zero and 15 degree gang angle positions followed by a soil conditioning attachment.
Figure 15:
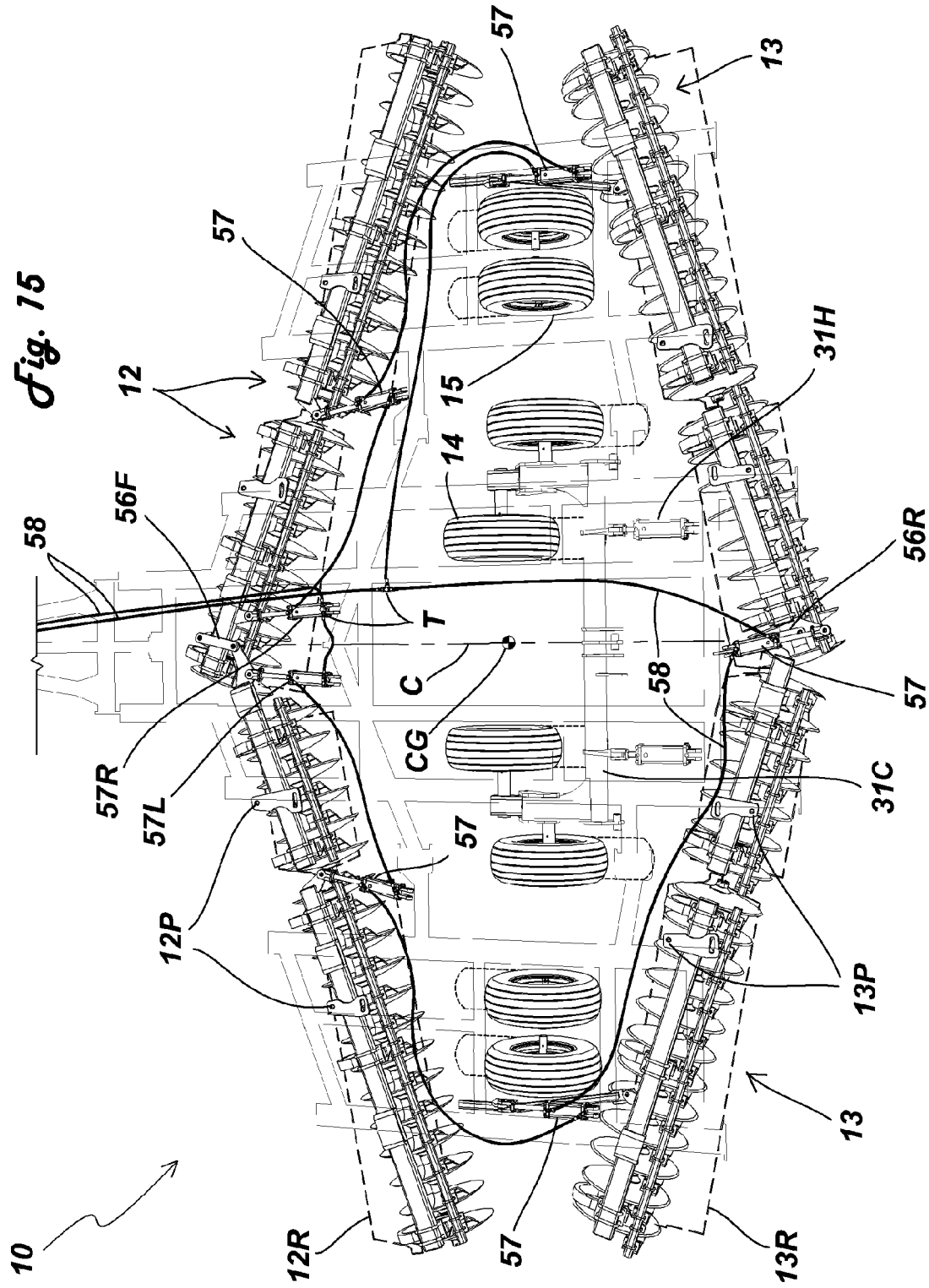
FIG. 15 is a plan view illustrating a blade and tire arrangement of a diamond-shaped disk harrow tillage tool with gangs at their highest angle for maximum soil disturbance showing dashed lines for the retracted actuator gang angle and fitted with a dual master-slave hydraulic rephasing actuator system.
Figure 17:
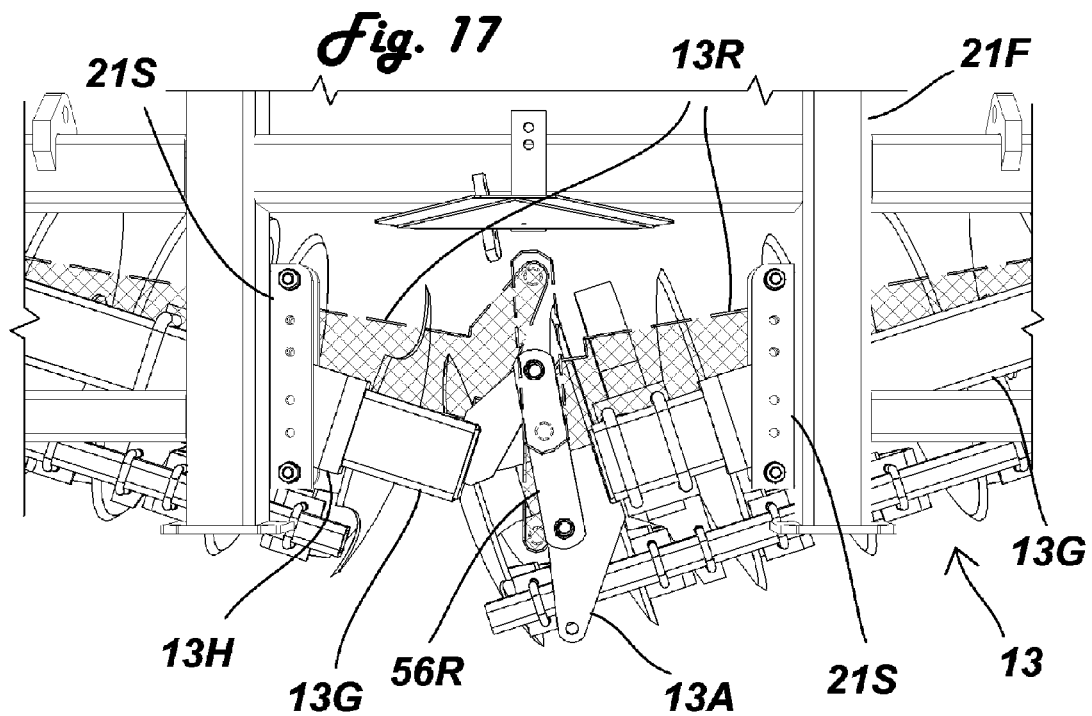
FIG. 17 is a partial perspective plan view of the rear center gangs showing the gang bar connecting linkage system (gang angle actuator removed for clarity).

The rear gang 13 can be arranged in a straight configuration (i.e., perpendicular to the direction of travel), as shown in FIG. 2 and the dashed lines in FIG. 9. Alternatively, the rear gang 13 can be arranged in a V-shaped configuration with an apex of the V-shape pointing opposite to the direction of travel, as shown in FIGS. 10, 15 and 17.

Figure 16:
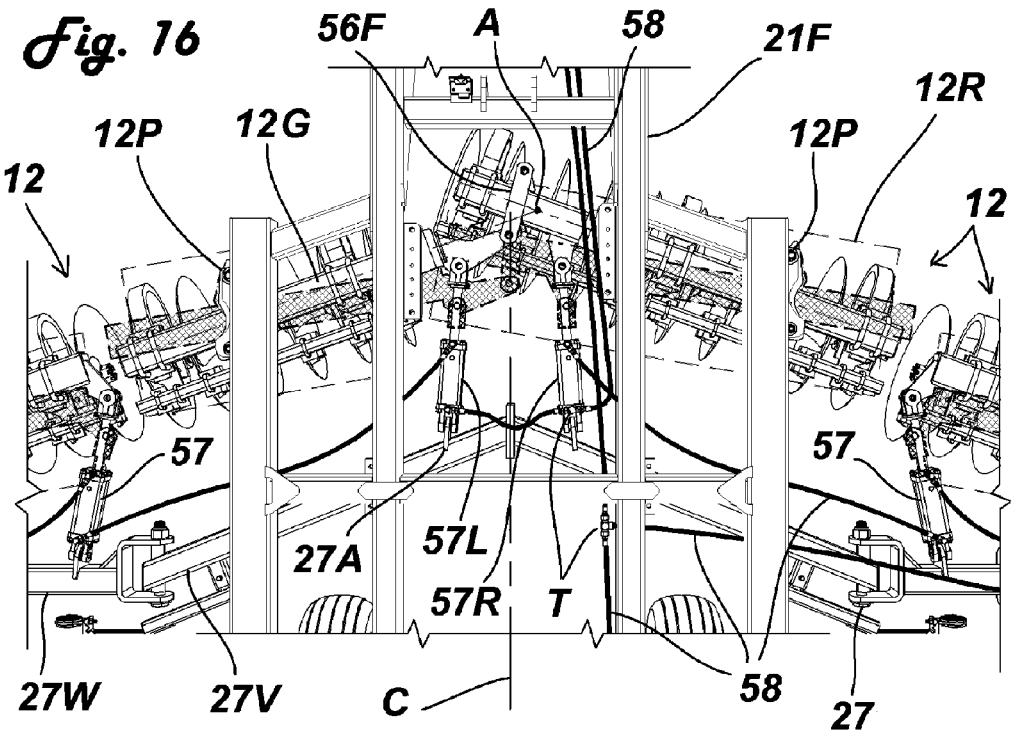
FIG. 16 is a partial perspective plan view of the offset front center gang arrangement with connecting linkage and offset apex fitted with a dual master-slave hydraulic rephasing actuator system with hose routing shown.

The wing sections 25 are pivotally connected to opposite sides of the center section 21 by fold members 27C, 27W, as illustrated in FIGS. 1, 9 and 16. The fold members 27C, 27W are located below the main frame 21F, 25F and have wing hinge points 27 located below the main frame 21F, 25F. The fold members include an assembly of front center fold members 27C attached below the main frame 21F of the center section 21. The front center fold members 27C are arranged in a V-shaped configuration with an apex of the V-shape pointed in the direction of travel and the outer trailing ends of the V-shape located beyond the respective outer sides of the main frame 21F of the center section 21.

A plurality of ground support wheels 14 are mounted to the main frame 21F of the center section 21 by a center lift assembly. The center lift assembly includes a center lift axle 31C mounted for rotation about an axis that extends perpendicular to the line of travel. The center lift axle 31C is attached to the fold member 27C by lift axle attachments points 31P positioned on the center fold member 27C, which are located below the main frame 21F. The center lift assembly also includes hydraulic lift actuators 31H connected to the center lift axle 31C for rotating the center lift axle 31C for raising and lowering the wheels 14. The lift actuators 31H are positioned below a top of the main frame 21F.

Figure 18:
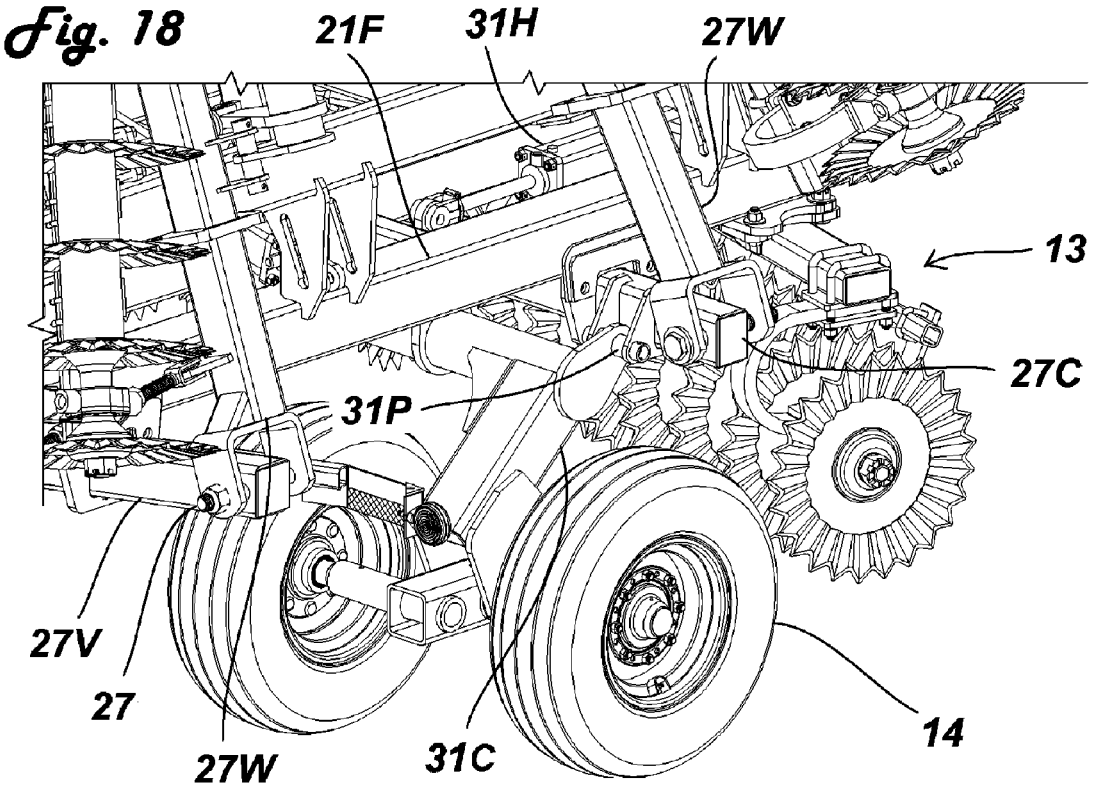
FIG. 18 is a partial perspective view of a shallow working tillage tool in folded transport position showing the lift axle connection to the fold member outside of the main center frame.
Figure 19:
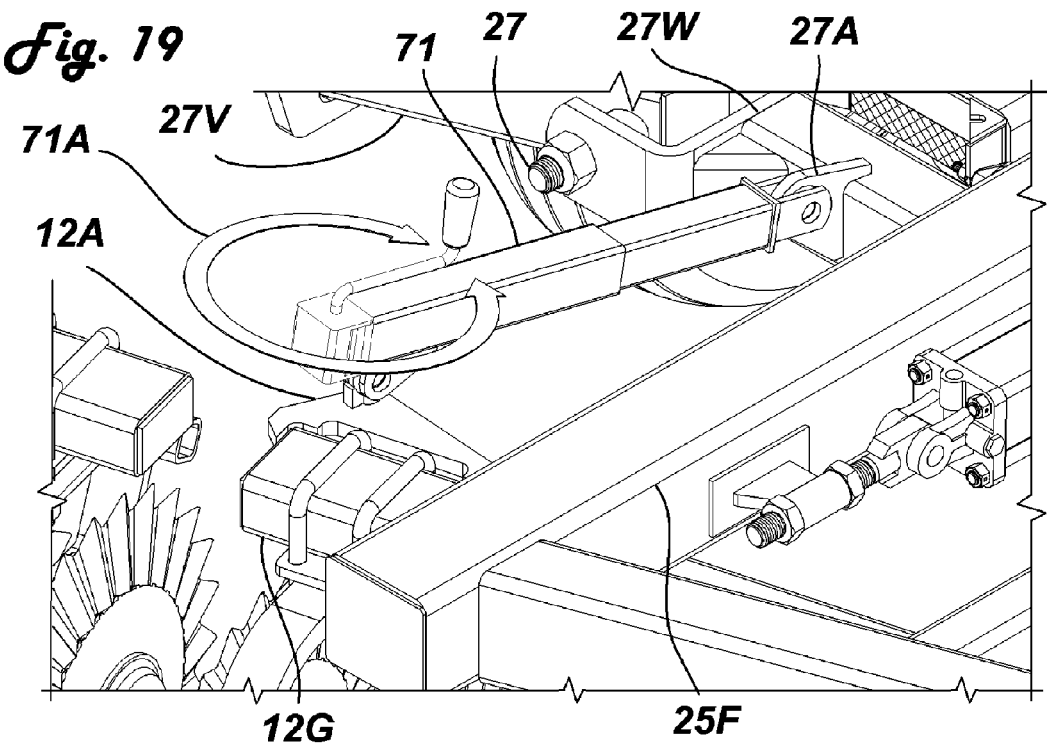
FIG. 19 is a partial perspective view of an alternative manual actuator system that uses a commercial screw jack assembly with a side wind type handle.
Figure 20:
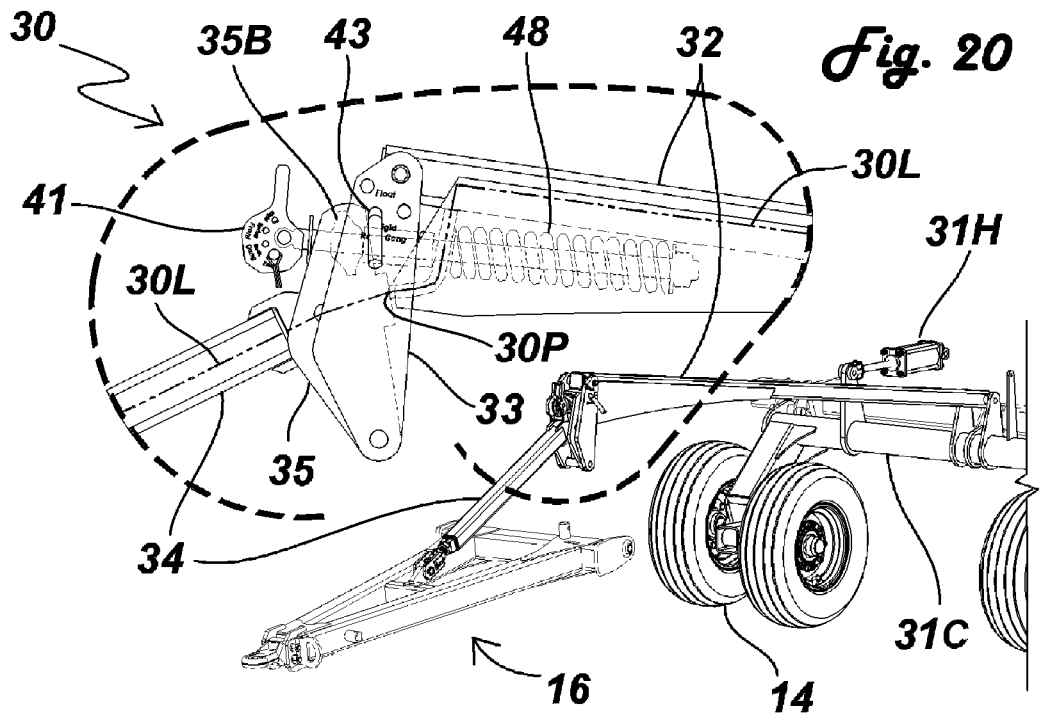
FIG. 20 is an alternate cut away view of the self-leveling, spring-biased hitch mechanism in the raised lift position showing the rotational contact point 30P between level bar 32 and rocker control link 35 and the resulting load path 30L.
Figure 21:
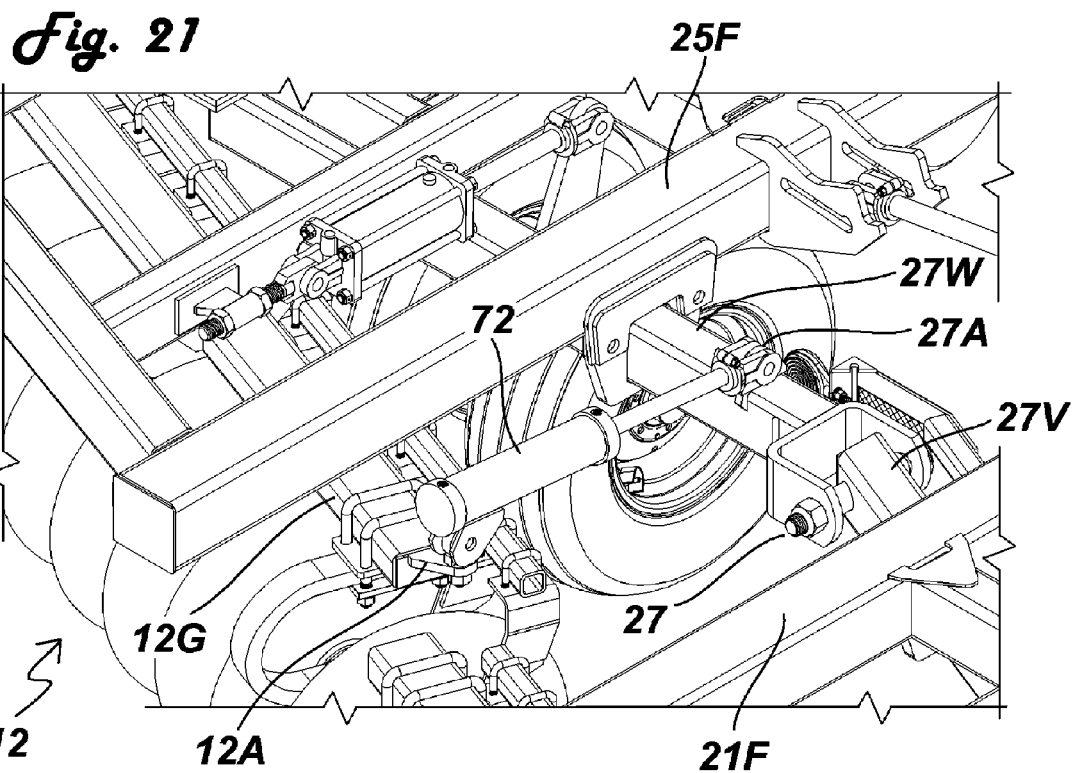
FIG. 21 is a partial perspective view of an alternative hydraulic actuator arrangement that provides greater angle changes in a compact space.

The center lift assembly is arranged to move the support wheels 14 forward to a position near a center of gravity CG of the implement when the implement is lowered to its field working position, as illustrated in FIG. 10. As a result, the support wheels 14, 15 can be used to provide floating hitch mode depth control to both the front and rear gangs 12, 13 simultaneously. The center lift assembly is also arranged to move the support wheels 14 rearward to a position behind the center of gravity CG of the implement when the implement is raised to its transport position to provide a safe positive tongue weight. The center lift assembly is attached to the center fold members 27C, as illustrated in FIGS. 9 and 18, outside of the main frame 21F dimensions to provide a more stable and efficient transfer of wing weight to the support wheels 14 of the center section 21.

In the embodiments illustrated in FIGS. 1 and 2, a hitch assembly 16 is connected to the center section 21 for connecting the implement to a tractor or towing vehicle 17. The hitch assembly 16 includes a hitch frame 22 mechanically linked to the ground support wheels 14 by a self-leveling linkage system. The linkage system functions to maintain the implement level during transport and field end row turning, while also providing diverse front and rear gang operation modes.

The linkage system includes a level bar 32 that is pivotally connected to and extends forward from a throw arm on the center lift axle 31C. A front end of the level bar 32 is pivotally connected to an upper end of a rocker link 33. A lower end of the rocker link 33 is pivotally connected to the main frame 21F. The level bar 32 is arranged to move generally in a fore and aft direction when the center lift axle 31C is rotated.

In the embodiments illustrated in FIGS. 1, 3 and 4, a control link 35 is pivotally connected between the hitch frame 22 and the main frame 21F. For example, the control link 35 can be connected to the main frame 21F with the same pin used to connect the lower end of the rocker link 33 to the main frame 21F. The control link 35 is nested between opposite sides of the rocker link 33 and can be pivoted independently of the rocker link 33.

When the implement is raised, the level bar 32 is moved in a forward direction causing the rocker link 33 to pivot about its lower end connection. As the level bar 32 is moved forward, a load transfer point 30P (see FIG. 20) on the front end of the level bar 32 engages a corresponding load transfer point on the control link 35. As a result of the rotational interaction and direct engagement between the level bar 32 and the control link 35, the hitch assembly 16 is held in a rigid condition relative to the main frame 21F when the implement 10 is raised. In similar embodiment(s) illustrated in FIGS. 4 to 6, the level spacer tube 46 provides the load transfer means between the level bar 32 and the control link 35. Control link rotational stop lugs 35A are provided to engage the main frame member 21F if the implement becomes tail heavy during transport. Thus, the implement 10 is placed in a rigid level state mode when the implement is raised, regardless of the spring force setting of the self-leveling linkage system, thereby ensuring that the implement remains stable and level during transport.

When the implement is lowered into its field working position, the level bar 32 is retracted rearwardly, causing the load transfer point 30P to move out of engagement with the control link 35. As a result, the hitch assembly 16 can be automatically moved out of its rigid level state and into one of its selected hitch operation modes as the implement is lowered.

A spring assembly is arranged to allow relative movement between the hitch frame 22 and the main frame 21F when the implement 10 is in a lowered field working position, and to be deactivated when the implement 10 is in a raised position. The spring assembly includes a hitch bias compression spring 48 and a level spacer tube 46. Although the spring 48 is illustrated in the drawings as a coiled spring, the term "spring" as used in this application is intended to cover other elastic members, such as solid rubber members or pneumatic springs or the like. Likewise, the term "spring rod" as used in this application is intended to also cover a mechanical outer structure encasing a solid rubber elastic member or the like.

Figure 7:
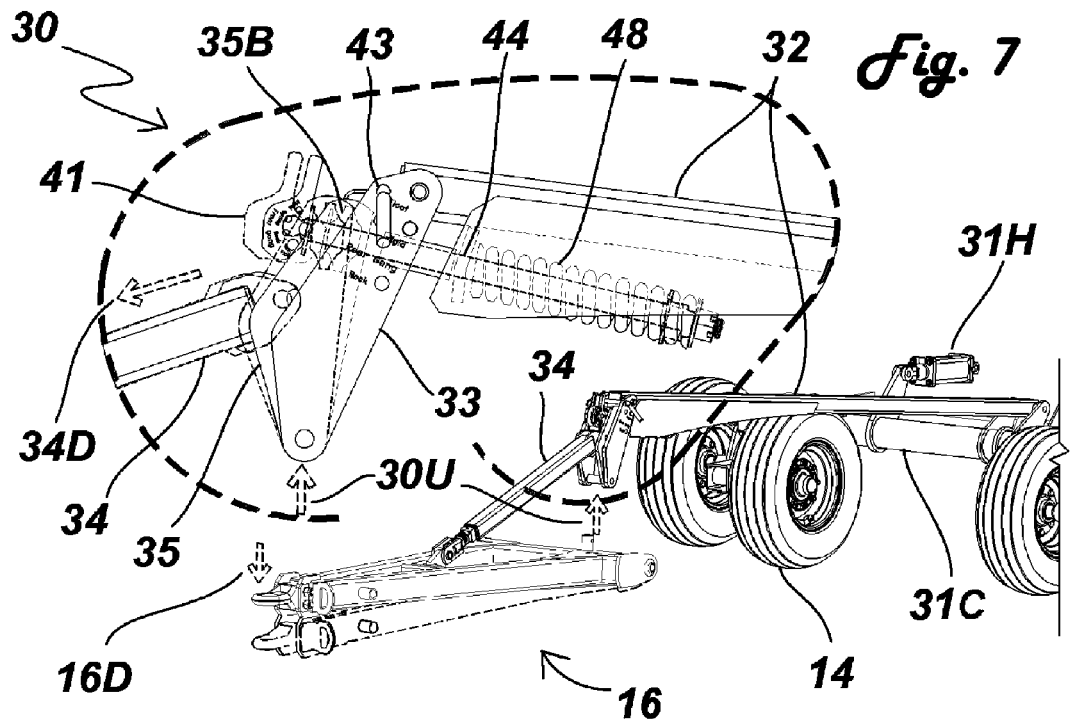
FIG. 7 is a cut away view of the self-leveling, spring-biased hitch mechanism in floating hitch operation field mode showing the hitch bar 34, rocker control link 35, spring rod 44 and hitch mode cam 41 movements when the hitch flexes downward due to terrain changes or when the front gang encounters a field obstruction.
Figure 8:
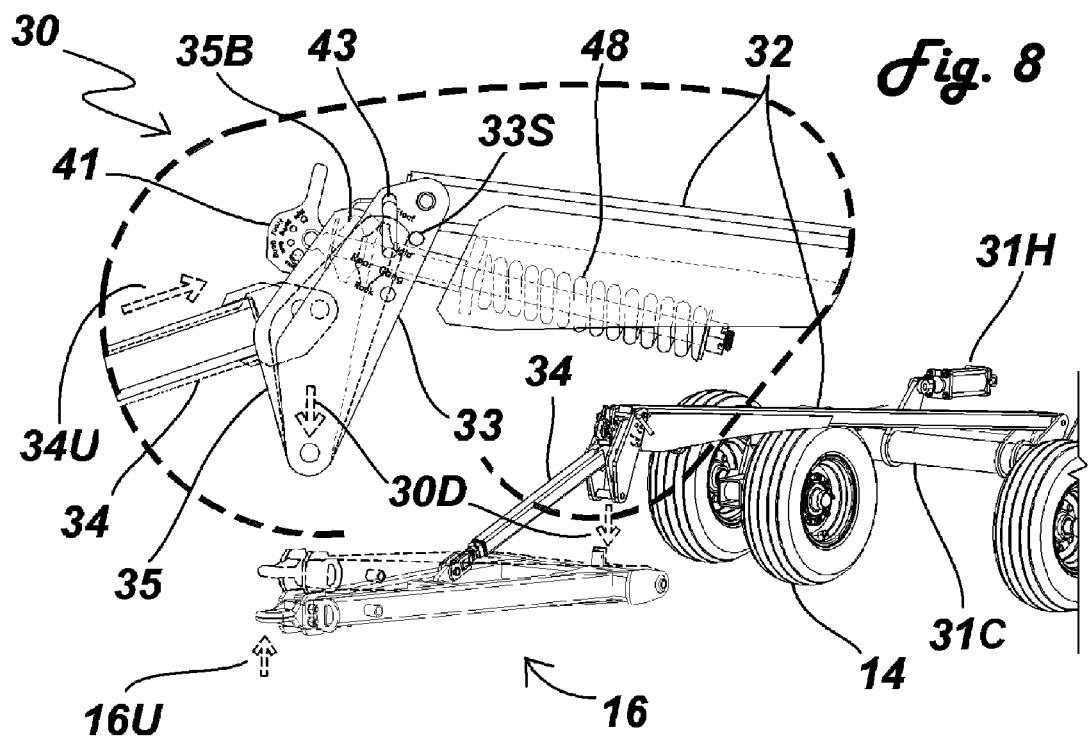
FIG. 8 is a cut away view of the self-leveling, spring-biased hitch mechanism in floating hitch operation field mode showing the hitch bar 34 and rocker control link 35 movement when the hitch flexes upward due to terrain changes or when the rear gang encounters a field obstruction.

The spring assembly also includes a spring rod 44 extending through a center of the spring 48 and the level spacer tube 46, a washer 49 and lock nut 50 placed on one end of the spring rod 44, and a washer 45 and cam assembly 41 on the other end of the spring rod 44. The spring rod 44 extends through a control link ball joint 35B on the control link 35 and a flange on the level bar 32. The spring 48 is sandwiched between the washer 49 and the rear side of the flange on the level bar 32, while the level spacer tube 46 is sandwiched between the front side of the flange on the level bar 32 and the ball joint 35B. The upward and downward movement of the hitch assembly 16 and the reaction forces therefrom are illustrated in FIGS. 7 and 8.

The cam assembly 41 provides an adjusting means for varying the spring working preload on the hitch bias spring 48. The cam assembly includes a cam member 41 pivotally mounted to a fixed structure on the forward end of the spring rod 44. A pin 42, such as a wire lock pin, can be inserted through an aligned cam selection hole 41S in the cam member 41 to lock the cam member 41 in a selected position relative to the fixed structure on the spring rod 44. The cam member 41 has a plurality of cam faces, each of which is a different distance from the pivot point of the cam member 41. The cam member 41 can be rotated to place a selected one of the cam faces into engagement with the washer 45, thereby changing the activation distance (i.e., the effective length) of the spring rod 44 and varying the amount of spring working preload placed on the spring 48.

Figure 6:
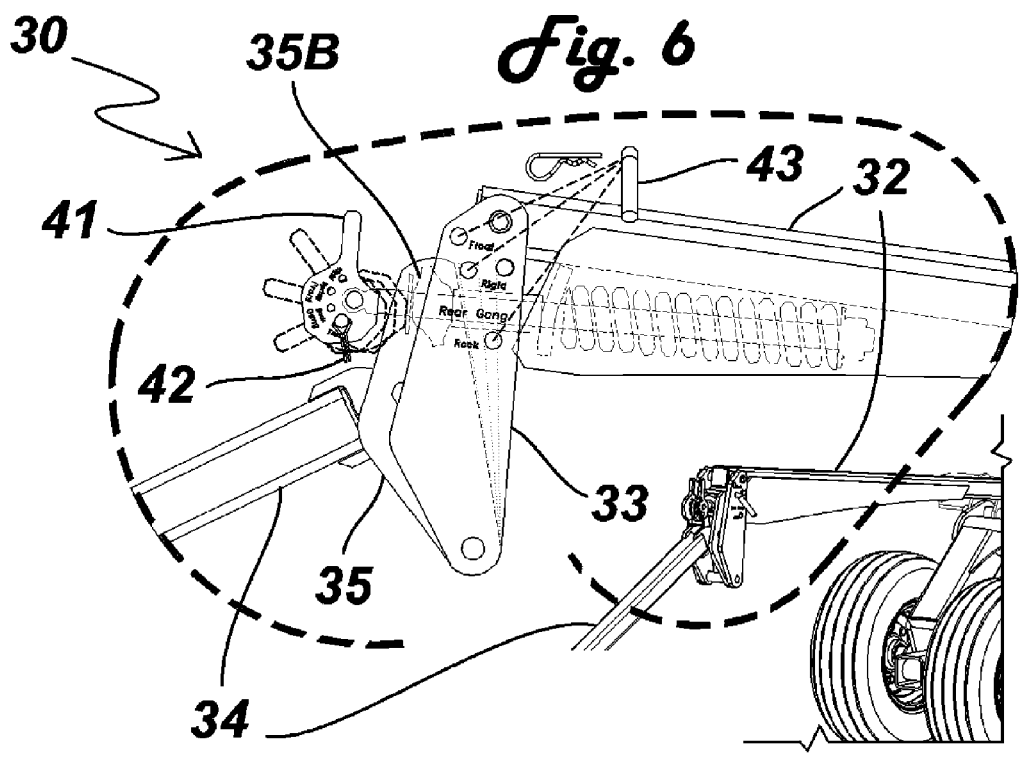
FIG. 6 is a cut away view of the self-leveling, spring-biased hitch mechanism in the raised lift position showing the hitch mode cam 41 and rear gang mode adjustment pin 43 changeable positions.

For example, the cam member 41 can have four settings defined by four different cam faces, as illustrated in FIGS. 3 and 6. The first setting is a rigid mode in which the greatest amount of spring working preload is placed on the spring 48. The second setting is a spring mode in which less spring preload is placed on the spring 48. The third setting is a rock mode in which still less spring preload is placed on the spring 48. The fourth setting is a float mode in which little or no spring working preload is placed on the spring 48. The spring assembly is compressed into progressively lower spring preloads, or zero working preload in the case of the float mode, as the cam member 41 is changed from the rigid mode to the spring mode to the rock mode to the float mode.

When the implement 10 is raised, the level bar 32 moves forward and reduces or completely removes the tension on the spring rod 44. As a result, the cam member 41 can be easily rotated for adjustment to a different setting when the implement 10 is raised. As the implement 10 is lowered from its raised position into its lowered position, the spring rod 44 engages the spring 48 again to apply the selected amount of spring working preload for the selected hitch operation mode.

The linkage system also includes a second adjustment means for adjusting a limit of upward hitch movement to provide a plurality of rear gang hitch operation modes. The second adjustment means includes an adjustment pin 43 that can be selectively placed in either of three sets of holes through the rocker link 33. The top set of holes 33F provide a float hitch operation mode for the rear gang 13. When placed in the top set of holes 33F, the pin 43 remains out of the path of movement of the control link 35, thereby allowing the control link 35 to pivot relative to the rocker link 33 to provide a rear gang floating hitch operation mode. When placed in the lower set of holes 33R or 33K, the pin 43 limits the upward hitch movement by placing an upper limit on the relative pivoting movement between the control link 35 and the rocker link 33, thereby providing a rear gang rigid hitch operation mode.

In the embodiments illustrated in FIGS. 16 and 17, the front and rear gangs 12, 13 of the implement 10 comprise gang bars 12G, 13G on which the tillage tools are mounted. The gang bars 12G, 13G are separate from the main frame 21F and are not hinged together. The gang bars 12G, 13G are mounted below the main frame 21F using an assembly that allows adjustment of the angle of the gang bars 12G, 13G relative to the main frame 21F to accommodate variable soil and residue disturbance needs.

The gang bar mounting assembly, as illustrated in FIGS. 11 to 14, includes at least one and preferably two hooped components 12H, 13H located on top of each of the gang bars 12G, 13G, and corresponding rigid slide adjustment bars 61B attached to the bottom of the main frame 21F, 25F. The slide adjustment bars 61B are arranged to slide through the hooped components 12H, 13H to allow the angle of the gang bars 12G, 13G to be adjusted. The hooped components 12H, 13H thus travel along the rigid slide adjustment bars 61B during angle adjustments. Slide pins 61P can be inserted into aligned holes in the rigid slide adjustment bars 61B to quickly and accurately establish a common angle setting for all of the gang bars 12G, 13G on the implement. Threaded fasteners extend between a pivot plate on the gang bar and a corresponding pivot plate on the main frame and can be tightened to secure the gang bars in their adjusted positions.

The gang bar angles can be adjusted to approximately 0 to 5 degrees to cause the tillage tools to have a high speed, shallow working "true vertical" tillage action. The gang bar angles can be adjusted to approximately 5 to 18 degrees to cause the tillage tool to behave as a high disturbance vertical tillage tool. The gang bar angles can also be adjusted to approximately 16 to 20 degrees to cause the tillage tools to have a medium to slow speed, deeper working disk harrow type action.

A mechanical screw device, such as a turnbuckle 55, can be attached between the gang bar and the main frame to provide a manual adjustment of the gang bar angle. Alternatively, a rephasing hydraulic actuator system 57, as illustrated in FIGS. 15 to 17, can be used to provide a remote adjustment of the gang bar angle.

The front gang 12 of the center section 21 includes left and right front center gangs, and the rear gang 13 of the center section 21 includes left and right rear center gangs. The left and right front center gangs can be linked together by a mechanical link 56F to move in time with each other when adjusting an angle of the front gang bars 12G relative to the main frame 21F, 25F. Similarly, the left and right rear center gangs can be linked together by a mechanical link 56R to move in time with each other when adjusting an angle of the rear gang bars 13G relative to the main frame 21F, 25F.

While the invention has been specifically described in connection with specific embodiments thereof, it is to be understood that this is by way of illustration and not of limitation, and the scope of the appended claims should be construed as broadly as the prior art will permit.

REFERENCE NUMERAL LIST

The following is a list of reference numerals used in the drawings of this application, along with the name of the labeled part:

A Apex
CG Center of gravity
C Center line
T Hydraulic Tee
10 FIG. 1 Three-section shallow working implement
10 FIG. 2 Generic shallow working implement
10 FIG. 9 Wide center shallow working implement
10 FIG. 10 Variable gang angle disk harrow
10 FIG. 15 Variable gang angle disk harrow
12 Front gang assembly
12G Front gang bar tube
12A Front gang anchor
12P Front gang pivot point
12H Front gang hooped component
12Z Front gang zero angle
12M Front gang max angle
12R Front gang angle retract position
13 Rear gang assembly
13G Rear gang bar tube
13A Rear gang anchor
13P Rear gang pivot point
13H Rear gang hooped component
13Z Rear gang zero angle
13M Rear gang max angle
13R Rear gang angle retract position
14 Center depth gauging wheels
15 Wing depth gauging wheels
16 Hitch assembly
16D Hitch downward movement
16U Hitch upward movement
17 Tractor or Towing vehicle
18 Field Obstruction
18R Obstruction reaction
21 Center frame section
21F Center frame
21S Center slide plate
22 Tongue
23 Hitch coupler
24 Pivot pins
25 Wing section
25A Wing gang adjustment anchor
25F Wing frame
25S Wing slide plate
25P Wing gang pivot plate
27 Pivot connections
27H Hydraulic actuators
27C Fold member (center)
27W Fold member (wing)
27A Gang adjustment anchor
27V Front center fold member
29 Soil conditioning attachment
30 Self level assembly
30L Raised Load Path
30P Load transfer point
30U Upward movement or Upward reaction
30D Downward movement or Downward reaction
31C Center lift axle
31P Lift axle pivot point
31H Hydraulic lift actuator
32 Level bar
33 Rocker link
33R Rear gang rigid pin position
33F Rear gang float pin position
33K Rear gang rock pin position
33S Rocker link stop rod
34 Hitch bar
34A Hitch height adjustment
34U Hitch bar upward movement
34D Hitch bar downward movement
35 Rocker control link
35B Control link ball joint
41 Hitch mode cam
41S Cam selection hole
42 Wire lock pin
43 Rear gang mode adjustment pin
43A Adjustment pin keeper
44 Spring rod
45 Cam washer
46 Level spacer tube 47 Washer
48 Hitch bias spring
49 Washer
50 Lock nut
55 Gang turnbuckle
56F Front gang connecting link
56R Rear gang connecting link
57 Hydraulic actuator (slave)
57R Right hydraulic actuator (master)
57L Left hydraulic actuator (master)
58 Hydraulic hose
59 Wing gang adjustment bar
61B Slide adjustment bar
61S Slide spacers
61P Slide pins
71 Screw jack actuator
71A Screw jack adjustment motion

What is claimed is:

1. An agricultural implement comprising:
a main frame with a plurality of ground support wheels;
front and rear gangs of rotatable tillage tools mounted to said main frame, said tillage tools being arranged to follow each other along a line of travel, said front gang having a V-shaped configuration with its apex pointing in the direction of travel, and said rear gangs having a straight configuration or a V-shaped configuration with its apex pointing opposite the direction of travel;
said front and rear gangs comprise gang bars on which said tillage tools are mounted, said gang bars are separate from said mainframe and are not hinged together; and
a gang bar angle adjusting mechanism for field adjusting an angle of the gang bars relative to the main frame to accommodate different soil and residue disturbance needs.

2. The implement according to claim 1, wherein said ground support wheels are mounted to said main frame by a center lift assembly, said center lift assembly being arranged to move the support wheels forward to a position near a center of gravity of the implement when the implement is lowered to its field working position to provide even depth control to both front and rear gangs simultaneously, and to move the support wheels rearward to a position behind the center of gravity of the implement when the implement is raised to its transport position to provide safe positive tongue weight.

3. The implement according to claim 1, further comprising left and right wing frames attached to said main frame, front and rear gangs attached to each wing frame, a wing lift assembly having at least one wing support wheel associated with each wing frame, and each wing lift assembly being arranged to move the wing support wheels rearward away from soil flow when the implement is lowered to its field working position, and to move the wing support wheels forward to support both gangs when the implement is raised to its transport position.

4. The implement according to claim 1, wherein said implement comprises a center section and at least a first set of left and right wing sections, said wing sections are pivotally connected to opposite sides of said center section by hinged wing fold members, and said hinged wing fold members have wing hinge points located below said main frame.

5. The implement according to claim 4, wherein said hinged wing fold members comprise an assembly of front wing fold frame members attached below the main frame of the center section, said front wing fold frame members being arranged in a V-shaped configuration with an apex of the V-shape pointed in the direction of travel and the outer trailing ends of the V-shape located beyond respective outer sides of the main frame of the center section to efficiently transfer draft loads from the center section to the wing sections.

6. The implement according to claim 4, further comprising a center lift assembly attached to said wing fold member of the center section outside of the main frame dimensions and close to the wing hinge points to provide an efficient transfer of wing weight to the center support wheels while providing a stable, wide wheel base for safe road transport.

7. The implement according to claim 1, wherein said gang bar angle adjusting mechanism comprises a mechanical screw device to provide a manual adjustment of an angle of the gang bars relative to the main frame.

8. The implement according to claim 1, wherein said gang bar angle adjusting mechanism comprises a rephasing hydraulic actuator system to provide a remote adjustment of an angle of the gang bars relative to the main frame.

9. The implement according to claim 1, wherein said gang bar angle adjusting mechanism is capable of providing gang angles of approximately 0 to 5 degrees to cause the tillage tools to have a high speed, shallow working action, and gang angles of approximately 5 to 18 degrees to cause the tillage tools to behave as a high disturbance vertical tillage tool, and gang angles of approximately 16 to 20 degrees to cause the tillage tool to have a medium to slow speed, deeper working disk harrow type action.

10. The implement according to claim 1, wherein said gangs further comprise at least one hooped component located on top of each gang bar that travels along a rigid component attached to the main frame during angle adjustments.

11. The implement according to claim 1, wherein the apex of the front gang is offset slightly from the centerline of the implement, wherein a number of left and right front gang blades are unequal on each side of the implement, and wherein a longer center gang is positioned farther forward than a shorter center gang to provide an overlapping blade arrangement with full soil cutout and plug-free operation.

12. The implement according to claim 1, wherein said main frame is mechanically linked to a hitch frame by a self-leveling linkage system; and
further comprising a spring assembly arranged to allow relative movement between the hitch frame and the main frame when the implement is in a lowered field working position; and
an adjustment mechanism arranged to adjust a field working preload of said spring assembly to provide a plurality of diverse front gang hitch operation modes.

* * * * *